United States Patent [19]
Itoh et al.

[11] Patent Number: 6,006,738
[45] Date of Patent: Dec. 28, 1999

[54] METHOD AND APPARATUS FOR CUTTING AN INGOT

[75] Inventors: Kunio Itoh; Nobutaka Tanaka, both of Utsunomiya, Japan

[73] Assignee: MEMC Japan, Ltd., Utsunomiya, Tochigi Prefecture, Japan

[21] Appl. No.: 08/895,388

[22] Filed: Jul. 16, 1997

[30] Foreign Application Priority Data

Aug. 13, 1996 [JP] Japan .................................. 8-213427

[51] Int. Cl.⁶ .................................................. B24D 1/08
[52] U.S. Cl. ..................... 125/21; 125/16.01; 125/16.02; 451/60; 451/446
[58] Field of Search ............................ 125/16.01, 16.02, 125/21; 451/36, 60, 446

[56] References Cited

U.S. PATENT DOCUMENTS

| | | |
|---|---|---|
| 4,246,003 | 1/1981 | Regler et al. . |
| 5,201,305 | 4/1993 | Takeuchi .............................. 125/16.01 |
| 5,269,285 | 12/1993 | Toyama et al. ...................... 125/16.01 |
| 5,387,331 | 2/1995 | Ahern et al. . |
| 5,628,301 | 5/1997 | Katamachi ............................... 125/21 |
| 5,799,643 | 9/1998 | Miyata et al. ........................... 125/21 |

FOREIGN PATENT DOCUMENTS

| | | | |
|---|---|---|---|
| 0 767 035 A1 | 4/1997 | European Pat. Off. . | |
| 3305695 | 8/1984 | Germany ................................ 125/21 |
| 1-177958 | 7/1989 | Japan . | |
| 7-1442 | 1/1995 | Japan . | |
| 7-52149 | 2/1995 | Japan . | |
| 8-39430 | 2/1996 | Japan . | |
| 8-57847 | 3/1996 | Japan . | |
| 8-57848 | 3/1996 | Japan . | |
| 8-60176 | 3/1996 | Japan . | |
| 8-99261 | 4/1996 | Japan . | |

OTHER PUBLICATIONS

European Patent Office Patent Abstract of Japan, Publication No. 02262955, entitled "Method of Cutting Ingot by Wire Saw", Oct. 25, 1990.

European Patent Office Patent Abstract of Japan, Publication No. 03239507, entitled "Cutting Method for Si Ingot by Wire Saw", Oct. 25, 1991.

Primary Examiner—Robert A. Rose
Assistant Examiner—George Nguyen
Attorney, Agent, or Firm—Senniger, Powers, Leavitt & Roedel

[57] ABSTRACT

A method for cutting an ingot with a wire. The method includes the steps of moving a wire in a lengthwise direction and contacting an ingot with the moving wire. The method also includes the step of supplying an abrasive slurry containing cutting oil and abrasive particles having an average diameter of about 13 μm to about 15 μm to the ingot when the ingot and the wire are contacting. This results in the ingot being cut with the wire and abrasive particles.

13 Claims, 4 Drawing Sheets

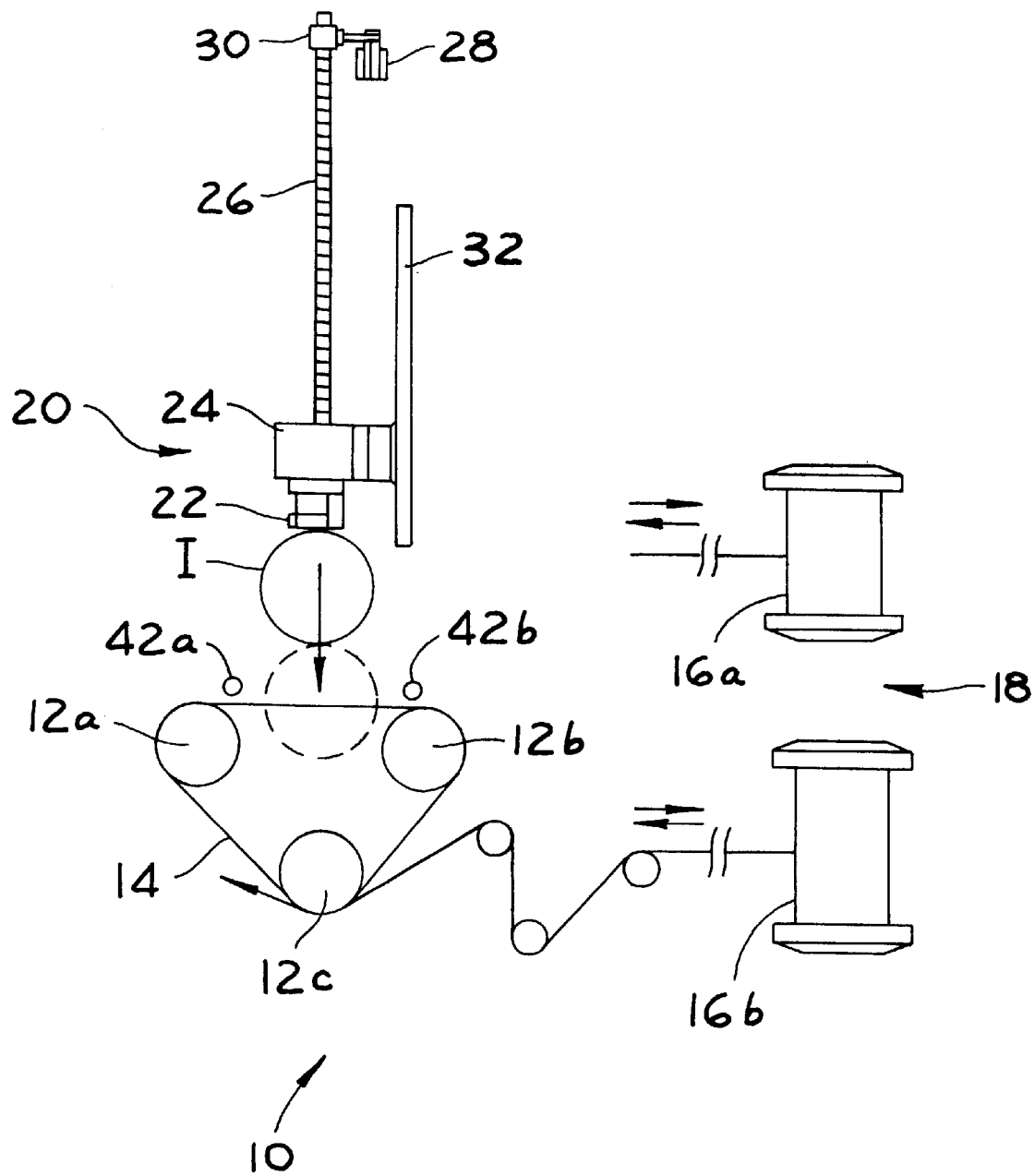

METHOD AND APPARATUS FOR CUTTING AN INGOT

BACKGROUND OF THE INVENTION

This invention relates generally to a method and apparatus for cutting a single crystal ingot into a plurality of wafers using a wire.

As illustrated in FIG. 5, a conventional apparatus for cutting an ingot I made of ceramics, glass, silicon, or the like into a plurality of wafers is indicated in its entirety by the reference numeral 10. The apparatus 10 includes three grooved 12a–12c, each of which has a plurality of circumferential guide grooves (not shown). The 12a–12c are mounted on an adjustable frame (not shown) at predetermined intervals so they are parallel to one another. A wire 14 is wrapped around the group of 12a–12c a plurality of times as shown in FIG. 5. The wire 14 is arranged in the guide grooves of the rollers so each length of the wire extending between the 12a–12c is parallel to the adjacent length of wire and so the lengths are uniformly spaced along the rollers. The frame is adjustable to change the spacing between the 12a–12c thereby changing the tension in the wire 14. The apparatus 10 also includes spools 16a, 16b for supplying and taking up wire 14 as it travels back and forth around the 12a–12c. Thus, the spools 16a, 16b form part of a drive mechanism, generally designated 18, which moves the wire 14 back and forth in a lengthwise direction.

The apparatus 10 also includes a fixture, generally designated by 20, for holding an ingot I and advancing it toward the wire 14. The fixture 20 includes a mount 22 to which the ingot I is bonded for supporting the ingot as it is sliced. The mount 22 is made of a relatively soft material such as carbon so it does not interfere with the wire 14 as it slices through the ingot I. The mount 22 is attached to a support head 24 for supporting the mount and ingot I as they are cut. The support head 24 may be made of any high strength material such as steel. A rack 26 extends upward from the support head 24, and a pinion 28 driven by a motor 30 engages the rack for advancing and retracting the ingot I toward and away from the wire 14. The fixture 20 also includes a linear guide 32 for guiding the fixture and ingot I so they remain perpendicular to the wire 14 as they are advanced and retracted.

As illustrated in FIG. 4, the conventional cutting apparatus 10 includes a fluid dispensing system, generally designated 40, for supplying an abrasive slurry containing abrasive particles and oil to the ingot I as it is cut. Spray nozzles 42a and 42b positioned over the wire 14 supply the slurry to the ingot I and wire. The slurry adheres to the wire 14 so it is drawn over the ingot I to enhance the cutting of the ingot.

The abrasive particles used in the slurry must have excellent cutting ability and be highly dispersible in oil. Conventional abrasive particles satisfy the aforementioned conditions, but they cause large kerf loss and deep wire marks on the cut surfaces of the wafers. Further, conventional abrasives damage the surface of the ingot I. These problems reduce the precision of the wafer cutting process thereby causing decreased wafer quality and yield.

SUMMARY OF THE INVENTION

The present invention solves these aforementioned problems. Among the objects of the present invention is to provide a method for cutting an ingot which avoids kerf loss, wire marks, and surface damage, thereby improving cutting precision, quality, and yield of the wafers obtained.

Briefly, a method of this invention is for cutting an ingot with a wire. The method comprises the steps of moving a wire in a lengthwise direction and contacting an ingot with the moving wire. The method also comprises the step of supplying an abrasive slurry containing cutting oil and abrasive particles having an average diameter of about 13 µm to about 15 µm to the ingot when the ingot and the wire are contacting. This results in the ingot being cut with the wire and abrasive particles.

In another aspect, the invention is directed to an apparatus for cutting an ingot. The apparatus comprises a wire and a drive mechanism connected to the wire for moving the wire in a lengthwise direction. The apparatus also comprises means for contacting the ingot with the wire as the drive mechanism moves the wire and a tank for holding an abrasive slurry containing abrasive particles in cutting oil. Moreover, the apparatus comprises a fluid dispensing system connected to the tank for dispensing the slurry from the tank to the ingot when the ingot and wire are contacting. Further, the apparatus comprises a pre-mix apparatus for mixing the slurry to uniformly disperse the abrasive particles within the cutting oil before being introduced to the fluid dispensing system tank.

Other objects and features of the invention will be in part apparent and in part pointed out hereinafter.

BRIEF DESCRIPTION OF THE DRAWINGS

FIG. 5 is a schematic showing a conventional apparatus for cutting an ingot with wire.

Corresponding reference characters indicate corresponding parts throughout the several views of the drawings.

DETAILED DESCRIPTION OF THE PREFERRED EMBODIMENT

Figure 1:
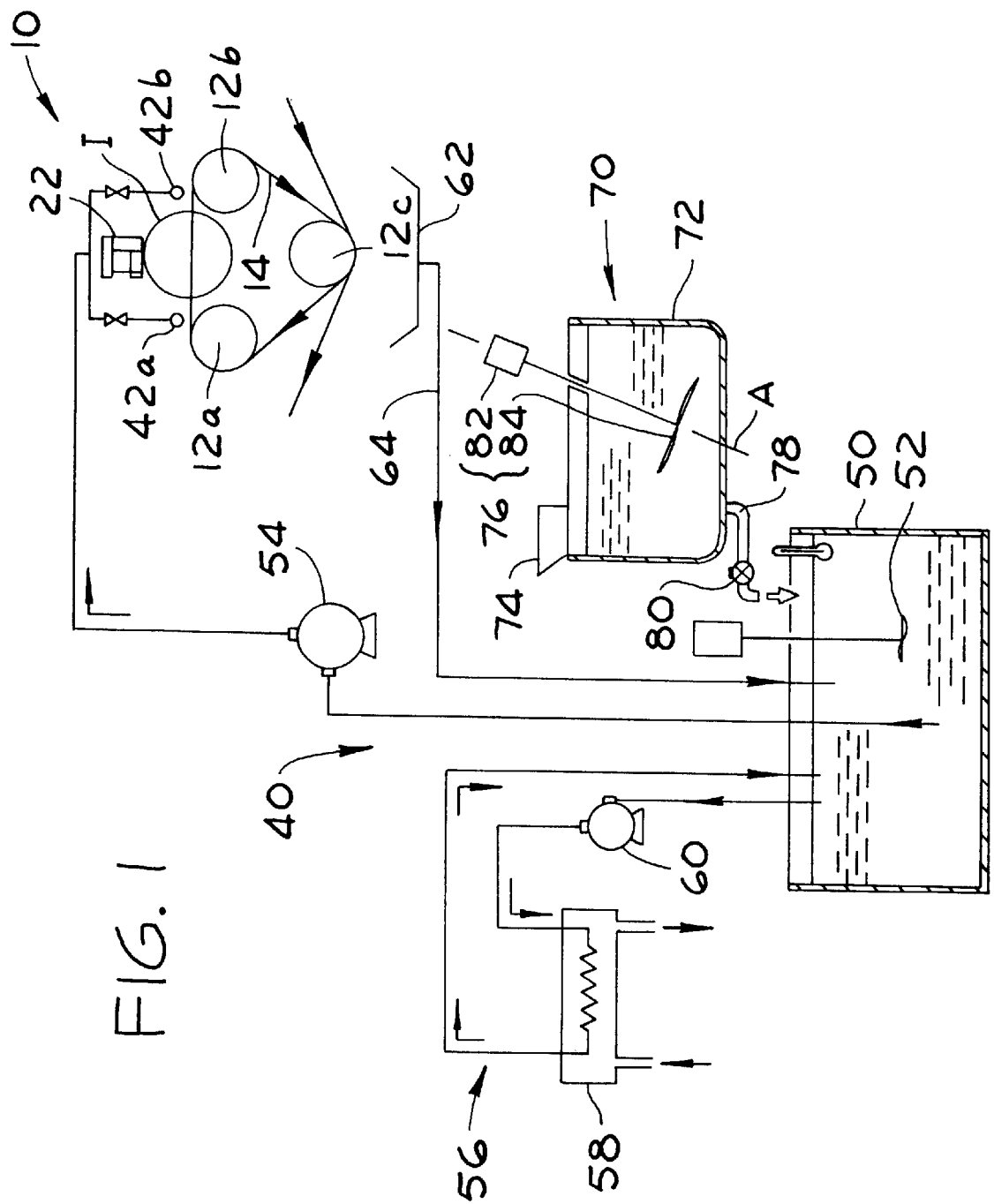
FIG. 1 is a schematic of an apparatus for cutting an ingot with wire used to perform a method of the present invention.

As illustrated in FIG. 1, an apparatus for cutting an ingot I made of ceramics, glass, silicon, or the like into a plurality of wafers is indicated in its entirety by the reference numeral 10. The apparatus 10 includes three grooved 12a–12c, each of which has a plurality of circumferential guide grooves (not shown). The 12a–12c are mounted on an adjustable frame (not shown) at predetermined intervals so they are parallel to one another. A wire 14 is wrapped around the group of 12a–12c a plurality of times in a generally triangular pattern as shown in FIG. 1. The wire 14 is arranged in the guide grooves of the 12a–12c so each length of the wire extending between the rollers is parallel to the adjacent length of wire and so the lengths are uniformly spaced along the rollers. The frame is adjustable to change the spacing between the rollers 12a–12c to adjust the tension in the wire 14. A drive mechanism 18 (FIG. 5) moves the wire 14 back and forth in a lengthwise direction around the 12a–12c at an average speed of 400–600 meters per minute and a rate of between 1 and 3 cycles per minute. However, it is envisioned that other rates and speeds are also within the scope of the present invention.

In addition, the apparatus 10 includes a mount 22 to which the ingot I is bonded for supporting the ingot as it is sliced. The mount 22 is made of a relatively soft material such as carbon so it does not interfere with the wire 14 as it slices through the ingot I. The mount 22 is actuated by a fixture 20 as shown in FIG. 5 and previously described with respect to conventional apparatus for cutting ingots with wire. The fixture 20 constitutes means for contacting the ingot I with the wire 14 as the drive mechanism 18 moves the wire.

As further illustrated in FIG. 1, the cutting apparatus 10 includes a fluid dispensing system, generally designated by 40, for supplying an abrasive slurry to the ingot I as it is cut. Spray nozzles 42a and 42b positioned over the wire 14 supply the slurry to the ingot I and wire. The slurry adheres to the wire 14 so abrasive particles contained in the slurry are carried by the wire into engagement with the ingot I to enhance cutting of the ingot.

The dispensing system 40 includes a tank 50 for holding the slurry. A stirrer 52 submerged in the slurry held in the tank 50 stirs the slurry to ensure the abrasive particles are evenly mixed in the oil. A pump 54 draws the slurry from the tank 50 and dispenses it at a predetermined flow rate (e.g., 50–100 liters per minute) through the nozzles 42a, 42b to the ingot I. A heating circuit, generally designated by 56, comprises a heat exchanger 58 and an auxiliary pump 60 which circulates the slurry through the heat exchanger to maintain it at a predetermined temperature (e.g., 20–30° C. and more preferably 25° C.). A collection pan 62 positioned under the 12a–12c and wire 14 collects used fluid, and a drain line 64 transports the collected fluid to the tank 50. About 15 to 20 percent of the used slurry in the tank 50 is changed every time a new ingot is cut.

Figure 2:
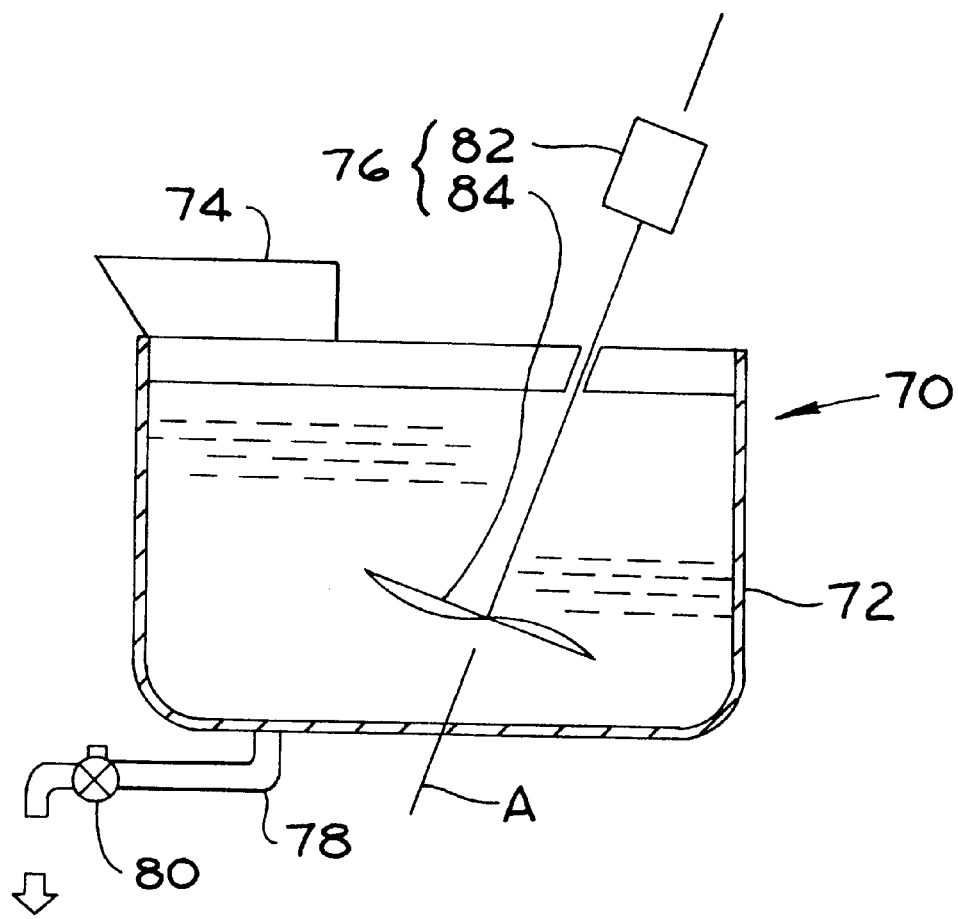
FIG. 2 is a schematic showing a pre-mix apparatus of the present invention.

A pre-mix apparatus or pre-mixer, generally designated by 70, supplies pre-mixed slurry to the tank 50. As illustrated in FIG. 2, the pre-mixer 70 comprises a vessel 72 having an inlet 74 through which abrasive particles and oil are introduced to the tank. A stirrer 76 stirs the abrasive particles and oil in the tank 72 to ensure they are evenly dispersed. A outlet line 78 having a control valve 80 transfers the slurry from the pre-mixer 70 to the tank 50 under the influence of gravity. The vessel 72 preferably has a cylindrical shape so the slurry does not stagnate as it is stirred.

The stirrer 76 comprises an electric motor 82 and blades 84. Preferably, the motor 82 is a 100 V single phase motor having a speed of between 200 and 500 rpm. The axis A of rotation of the blades 84 is tilted at an angle of about 5–15° with respect to vertical for circulating the fluid horizontally and vertically in the tank to disperse the abrasive particles. In an alternative embodiment, an ultrasonic generator (not shown) may be used to improve the dispersion of the particles. Any stirrer capable of dispersing the abrasive particles may be used without departing from the scope of the present invention.

The slurry is made of abrasive particles and oil. In the present invention, abrasive particles are preferably stirred in the slurry to uniformly disperse the particles before the slurry is dispensed onto the wire 14 and ingot I. The abrasive particles used in the slurry generally have an average diameter of 13–15 μm, as opposed to conventional abrasive particles which have an average diameter of about 20 μm. Smaller size abrasive particles tend to agglomerate. As a result, the cohesion among the abrasive particles can become greater than their tendency to disperse evenly in the oil under the influence of surfactants and dispersants contained in the oil. Preferably, the abrasive particles are evenly dispersed in the oil to avoid kerf loss, wire marks, and damage to the surface of the ingot. The previously-described pre-mixer 70 aides in evenly dispersing the particles throughout the slurry, and overcomes the tendency for the smaller particles to agglomerate.

Abrasive particles used in the slurry of the present invention are generally made of silicon carbide (SiC) having a composition of 96.0 percent or more of SiC, 0.5 percent or less of elemental carbon, and 0.3 percent or less of iron which is soluble in hydrochloric acid. Preferably, forty percent or more of the abrasive particles have a diameter of 13–15 μm, the maximum particle diameter is 38.0 μm or less, and the average diameter of the particles is between 13 and 15 μm.

The oil used in the slurry of the preferred embodiment is of the type used for hand saws and wire saws used to cut semiconductor elements made of silicon, glass, ceramics, or the like. The oil for the preferred embodiment has a composition of 82.0 percent refined mineral oil, 3.0 percent thickener, 4.0 percent of each of two kinds of non-ionic surfactants, 2.0 percent inhibitor, and 5.0 percent dispersant. The oil for the present invention has a specific gravity of 0.894 at 15° C. and a viscosity of 90 centipoise at 25° C.

The abrasive particles in the slurry of the preferred embodiment are mixed with the oil at a ratio of 1.0–1.5 kg per liter of the oil. The resulting slurry has a specific gravity of about 1.40–1.60 at 25° C., and a viscosity of between about 150 and about 300 centipoise at 25° C.

The present invention is hereinbelow described in more detail on the basis of examples. However, the present invention is by no means intended to be limited to the examples.

Demonstrative Example

An ingot I was cut using the apparatus 10 shown in FIG. 1 and a slurry comprising oil and abrasive particles having an average particle diameter of 14 μm (i.e., a grit size of GC#800). The abrasive particles and oil were introduced into the pre-mixer 70 in a ratio of 1.25 kg of abrasive to one liter of oil. They were stirred and mixed with a rotational frequency of about 300 rpm for about 30 minutes to evenly distribute the particles in the slurry. After the particles were thoroughly mixed, the valve 80 was opened and the slurry was dispensed into the tank 50. A silicon ingot I was sliced into wafers using the slurry and a wire 14 having a diameter of 0.18 mm as previously described.

Figure 3:
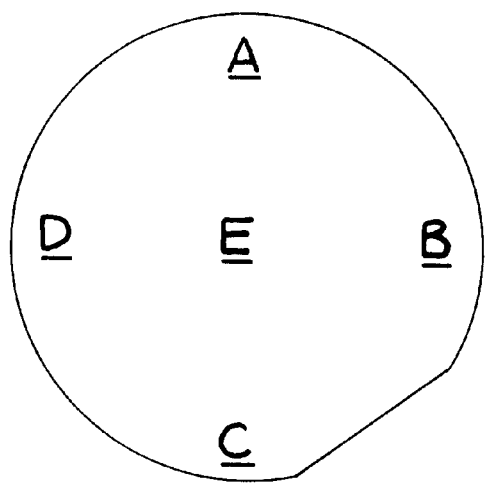
FIG. 3 is a plan of a wafer showing locations of measuring points used for evaluating wafers cut using the method of the present invention.

The surface roughnesses of each wafer were measured at the five points shown by letters A–E in FIG. 3. A stylus gauge sold by Mitsutoyo Co. under the trade name Surftest 501 was used to measure the surface roughness of the wafers. As is apparent to those skilled in the art, surface roughness is a measurement of the protrusions and depressions in the surface of the wafer. The results of the surface roughness measurements are shown in Table 1.

A non-contacting electric-capacity type sensor sold by ADE Corporation of Westwood, Mass. under the trade name UltraGage 9500 was used to measure total thickness variation, warp, and kerf loss of the wafers. Total thickness variation refers to the difference between the maximum measured thickness and the minimum thickness of a wafer. Warp refers to a difference between a maximum variance and a minimum variance from a standard surface of a wafer. Kerf loss refers to the loss of thickness of a wafer generated during cutting the wafer. It usually corresponds to a difference between a wire pitch and a thickness of a wafer. The results of these measurements are shown in Table 2.

Tape was applied to a surface of some of the wafers at intervals of 5 mm. The tape was removed sequentially as the wafer was etched to etch the wafer in steps. Then, X-ray diffraction was used to determine the depth of damage on the wafer. The results of these measurements are recorded in Table 3.

The damaged layer of some of the wafers was removed and the surface was lapped. Then, presence and number of the wire marks was determined after removing different amounts of material. Wire marks cause uneven wafer surfaces which are visible as bright spots after etching. The number of wire marks for differing amounts of material removal are recorded in Table 4. The removal amount refers to the amount of material removed from the wafer during the lapping step to achieve some predetermined wafer thickness. It usually corresponds to a difference of a thickness in a central portion of a wafer before and after lapping. The reject rate is also shown in Table 4. If a wafer was rejected regardless of the number of defects, it was counted as one rejection for the purposes of the reject rate.

Control Example

Figure 4:
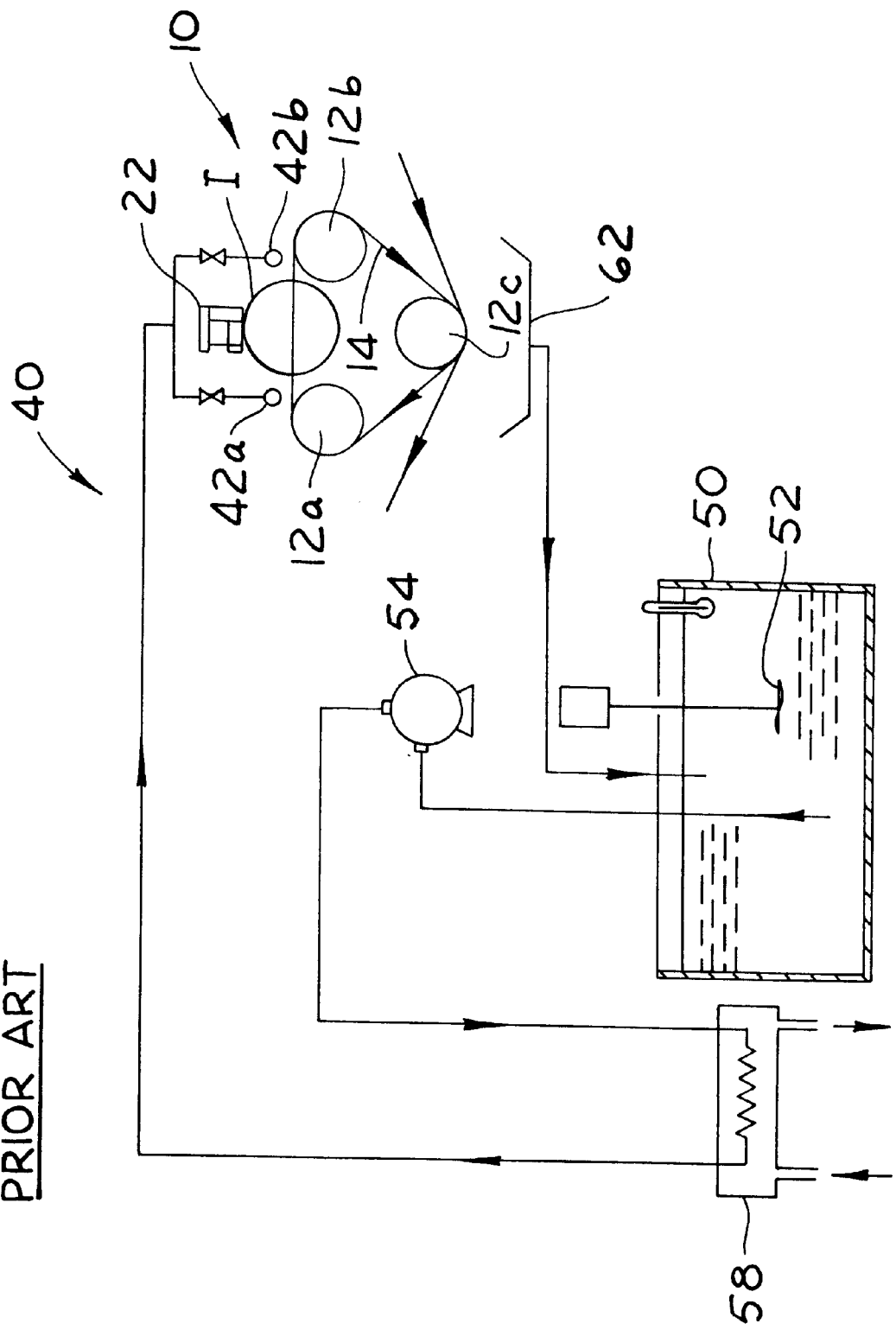
FIG. 4 is a schematic showing a conventional apparatus for cutting an ingot with wire.

In addition, silicon ingots were cut into wafers using the conventional method and apparatus as shown in FIG. 4. Abrasive particles having a grit size of GC#600 and oil were mixed in a pre-mix apparatus 34 in a ratio of 1.25 kilograms of particles to 1.0 liter of oil. They were stirred at 300 rpm for 30 minutes to obtain a slurry. The slurry was poured into a tank 50, and a silicon ingot was cut with a wire 14 having a diameter of 0.18 mm to obtain a silicon wafer.

Similar measurements were taken to those described above. The measured surface roughness is shown in Table 1. The measured wafer thickness (measured at the center of the wafer), total thickness variation, warp (before etching), warp (after etching), and kerf loss are shown in Table 2. The measured thickness of the damaged layer is shown in Table 3. The number of wire marks and the reject rate are shown in Table 4.

TABLE 1

| | Measuring Point | 1 | 2 | 3 | 4 | 5 |
|---|---|---|---|---|---|---|
| Present Invention | Surface roughness (μm) | 7.126 | 17.260 | 6.944 | 16.032 | 5.832 |
| Prior art | Surface roughness (μm) | 8.900 | 28.800 | 9.100 | 28.200 | 6.200 |

TABLE 2

| | Present Invention | Prior Art |
|---|---|---|
| Thickness at Center of Wafer (μm) | 879.10 | 885.66 |
| Total Thickness Variation (μm) | 15.25 | 22.52 |
| Warp (μm) | 16.44 | 10.69 |
| Warp after Etching (μm) | 12.18 | 14.19 |
| Kerf Loss (μm) | 230.90 | 244.34 |
| Wire Pitch (μm) | 1110 | 1130 |

TABLE 3

| | Damaged Layer Depth (μm) |
|---|---|
| Present Invention | Approx. 8.2 |
| Prior Art | Approx. 20.0 |

TABLE 4

| | Removal Amount (μm) | Number of Wire Marks | Number of Pieces | Percent Non-conforming |
|---|---|---|---|---|
| Present Invention | 81.5 | 0 | 64 | 0 |
| | 64.7 | 0 | 60 | 0 |
| | 57.1 | 0 | 40 | 0 |
| Prior Art | 100.0 | — | — | 3 |

Evaluation of Test Results

Wafers cut using abrasive particles having a grit size of GC#800 have several advantages over those cut with abrasive particles having a grit size of GC#600 (i.e., those used in the prior art).

Improvement of Kerf Loss

Kerf loss was reduced using the method and apparatus of the present invention. The kerf loss in the control example using abrasive particles having a grit size of GC#600 (i.e., the prior art) was 250 μm. However, the kerf loss in the demonstrative example using abrasive particles having a grit size of GC#800 was 230 μm, an improvement of 20 μm.

Reduction in Wire Mark Depth

The depth of wire marks (not shown in tables above) generated by using the prior art method and apparatus was 28 μm, but a wire mark depth of only 20 μm was generated using abrasive particles having a grit size of GC#800, an improvement of 8 μm.

In addition, the removal amount and the number wire marks per wafer decreased in the using abrasive particles having a grit size of GC#800 compared with the prior art (i.e, using abrasive particles having a grit size of GC#600).

Improvement of Damaged Layer on the Surface

The depth of the damaged layer was about 20 μm in the control example using abrasive particles having a grit size of GC#600, while a depth of a damaged layer was about 8 μm in the demonstrative example using abrasive particles having a grit size of GC#800.

In addition, it was found that particles having a grit size of GC#800 have a lower dispersibility in oil than particles having a grit size of GC#600 since the GC#800 particles have a smaller average particle diameter. However, the GC#800 particles can be dispersed in oil up to an independent particle level by employing the apparatus of the present invention.

From the aforementioned results, it was found that the method and apparatus for cutting an ingot of the present invention contributes to the decrease of a kerf loss, number and size of wire marks, and damage to the surface of wafers.

Accordingly, the method and apparatus for cutting ingots with a wire of the present invention decrease kerf loss, number and depth of wire marks, and damage on the wafer surfaces, thereby contributing to improvement of cutting precision, quality, and yield of a wafer-shaped product.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A method for cutting an ingot with a wire, comprising the steps of:

moving a wire in a lengthwise direction;

contacting an ingot with the moving wire;

pre-mixing an abrasive slurry containing cutting oil and abrasive particles having an average diameter of about 13 µm to about 15 µm to disperse the abrasive particles in the cutting oil;

introducing the mixed slurry into a fluid dispenser; and supplying the mixed slurry to the ingot from the fluid dispenser when the ingot and the wire are contacting thereby to cut the ingot with the wire and abrasive particles.

2. A method for cutting an ingot with a wire according to claim 1 further comprising the step of stirring the slurry to uniformly disperse the abrasive particles within the cutting oil before supplying the slurry to the ingot.

3. A method for cutting an ingot with a wire according to claim 1 wherein the abrasive particles and cutting oil are mixed in a ratio of between about 1.0 kg and about 1.5 kg of particles to about one liter of oil.

4. A method for cutting an ingot with a wire according to claim 3 wherein the abrasive particles and cutting oil are mixed in a ratio of about 1.25 kg of particles to about one liter of oil.

5. A method for cutting an ingot with a wire according to claim 1 wherein the slurry has a specific gravity of about 1.40 to about 1.60 at 25° C.

6. A method for cutting an ingot with a wire according to claim 1 wherein the slurry has a viscosity of between about 150 centipoise and about 300 centipoise at 25° C.

7. A method for cutting an ingot with a wire according to claim 1 wherein the slurry is supplied to the ingot at a flow rate of between about 50 liters per minute and about 100 liters per minute.

8. A method for cutting an ingot with a wire according to claim 1 wherein the slurry is supplied to the ingot at a temperature of between about 20° C. and about 30° C.

9. A method for cutting an ingot with a wire according to claim 8 wherein the slurry is supplied to the ingot at a temperature of about 25° C.

10. Apparatus for cutting an ingot comprising a wire;

a drive mechanism connected to the wire for moving the wire in a lengthwise direction;

means for contacting the ingot with the wire as the drive mechanism moves the wire;

a tank for holding an abrasive slurry containing abrasive particles in cutting oil;

a fluid dispensing system connected to the tank for dispensing the slurry from the tank to the ingot when the ingot and wire are contacting; and a pre-mix apparatus for mixing the slurry to uniformly disperse the abrasive particles within the cutting oil before being introduced to the fluid dispensing system tank.

11. Apparatus as set forth in claim 10 wherein the pre-mix apparatus comprises:

a vessel for holding predetermined amounts of cutting oil and abrasive particles; and a stirrer for stirring the slurry to uniformly disperse the abrasive particles within the cutting oil.

12. Apparatus as set forth in claim 11 wherein the stirrer comprises blades positionable in the slurry held within the vessel and a motor for driving the blades about an axis.

13. Apparatus as set forth in claim 12 wherein the blade axis is tilted with respect to vertical at an angle of between about 5° and about 15°.

* * * * *

UNITED STATES PATENT AND TRADEMARK OFFICE
CERTIFICATE OF CORRECTION

PATENT NO.   : 6,006,738
DATED        : December 28, 1999
INVENTOR(S)  : Kunio Itoh and Nobutaka Tanaka It is certified that error appears in the above-identified patent and that said Letters Patent is hereby corrected as shown below:

<u>Title page,</u>
Item "[73] Assignee: MEMC Japan, Ltd., Utsunomiya, Tochigi Prefecture, Japan" should read -- [73] Assingee: MEMC Electronic Materials, Inc., St. Peters, MO (US) --.

Signed and Sealed this

Sixth Day of April, 2004

JON W. DUDAS
*Acting Director of the United States Patent and Trademark Office*